United States Patent
Henry et al.

(10) Patent No.: US 8,602,683 B2
(45) Date of Patent: Dec. 10, 2013

(54) DEVICE FOR STORING A FLOATING OIL BOOM AND METHOD OF USING THE SAME

(75) Inventors: Brian D. Henry, North Lawrence, OH (US); Lance J. Armstrong, Raceland, LA (US)

(73) Assignee: Alphafuze Manufacturing, LLC, Navarre, OH (US)

( * ) Notice: Subject to any disclaimer, the term of this patent is extended or adjusted under 35 U.S.C. 154(b) by 317 days.

(21) Appl. No.: 12/984,286

(22) Filed: Jan. 4, 2011

(65) Prior Publication Data

US 2012/0034031 A1    Feb. 9, 2012

Related U.S. Application Data

(60) Provisional application No. 61/370,307, filed on Aug. 3, 2010.

(51) Int. Cl.
*E02B 15/04* (2006.01)

(52) U.S. Cl.
USPC .............. 405/67; 405/63; 405/66; 210/242.3; 210/923

(58) Field of Classification Search
USPC ................... 405/63, 66, 67; 220/751; 53/456; 210/242.3, 747.5, 923

See application file for complete search history.

(56) References Cited

U.S. PATENT DOCUMENTS

| | | | | |
|---|---|---|---|---|
| 4,507,017 | A * | 3/1985 | Magoon | 405/66 |
| 5,051,029 | A * | 9/1991 | Ecker | 405/68 |
| 5,071,545 | A * | 12/1991 | Ashtary | 210/153 |
| 5,246,394 | A * | 9/1993 | Jensen | 441/133 |
| 6,083,402 | A * | 7/2000 | Butler | 210/663 |
| 6,155,772 | A * | 12/2000 | Beale | 414/607 |
| 6,485,229 | B1 * | 11/2002 | Gunderson et al. | 405/63 |
| 6,540,925 | B2 * | 4/2003 | Takahashi et al. | 210/776 |
| 6,655,872 | B1 * | 12/2003 | Johnson | 405/66 |
| 7,862,258 | B2 * | 1/2011 | Meyers et al. | 405/215 |
| 2004/0234339 | A1 * | 11/2004 | Dreyer | 405/63 |
| 2009/0314791 | A1 * | 12/2009 | Hartley et al. | 220/751 |
| 2011/0262056 | A1 * | 10/2011 | Nomoto | 383/17 |

\* cited by examiner

*Primary Examiner* — Benjamin Fiorello
(74) *Attorney, Agent, or Firm* — Sand & Sebolt

(57) ABSTRACT

A storage device for retaining an extended length of floating oil boom therein and a method of using the same. The storage device is made from a sheet of material that is foldable to define and surround an interior cavity in which the oil boom is received. A closure mechanism is engaged to secure the folded storage device about the oil boom. A lifting mechanism on the storage device is engaged with a cable extending from a suspension assembly mounted on a vessel for use on a large body of water. The suspension assembly maintains the storage boom adjacent a side wall of the vessel and a distance above the surface of the water until the oil boom retained therein is needed in an emergency.

20 Claims, 18 Drawing Sheets

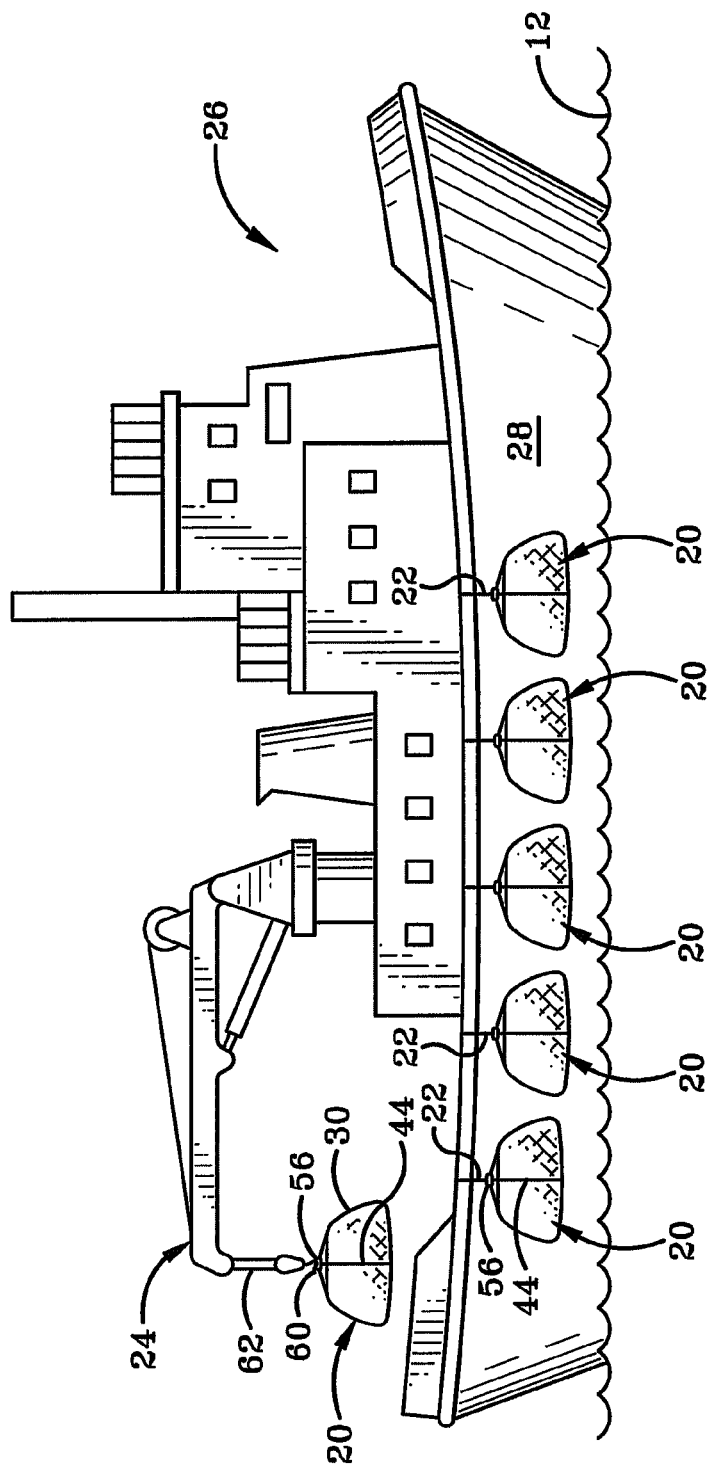

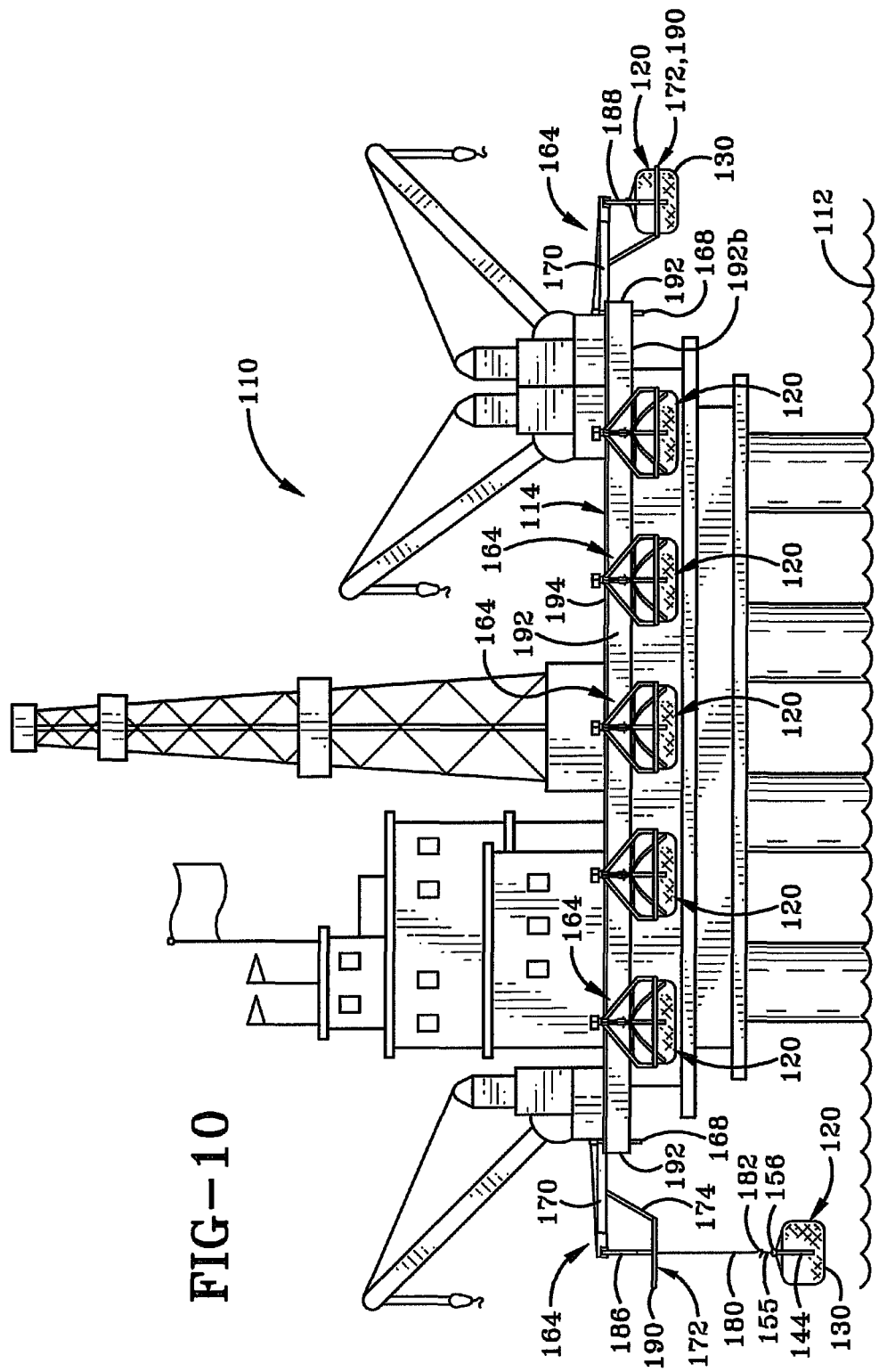

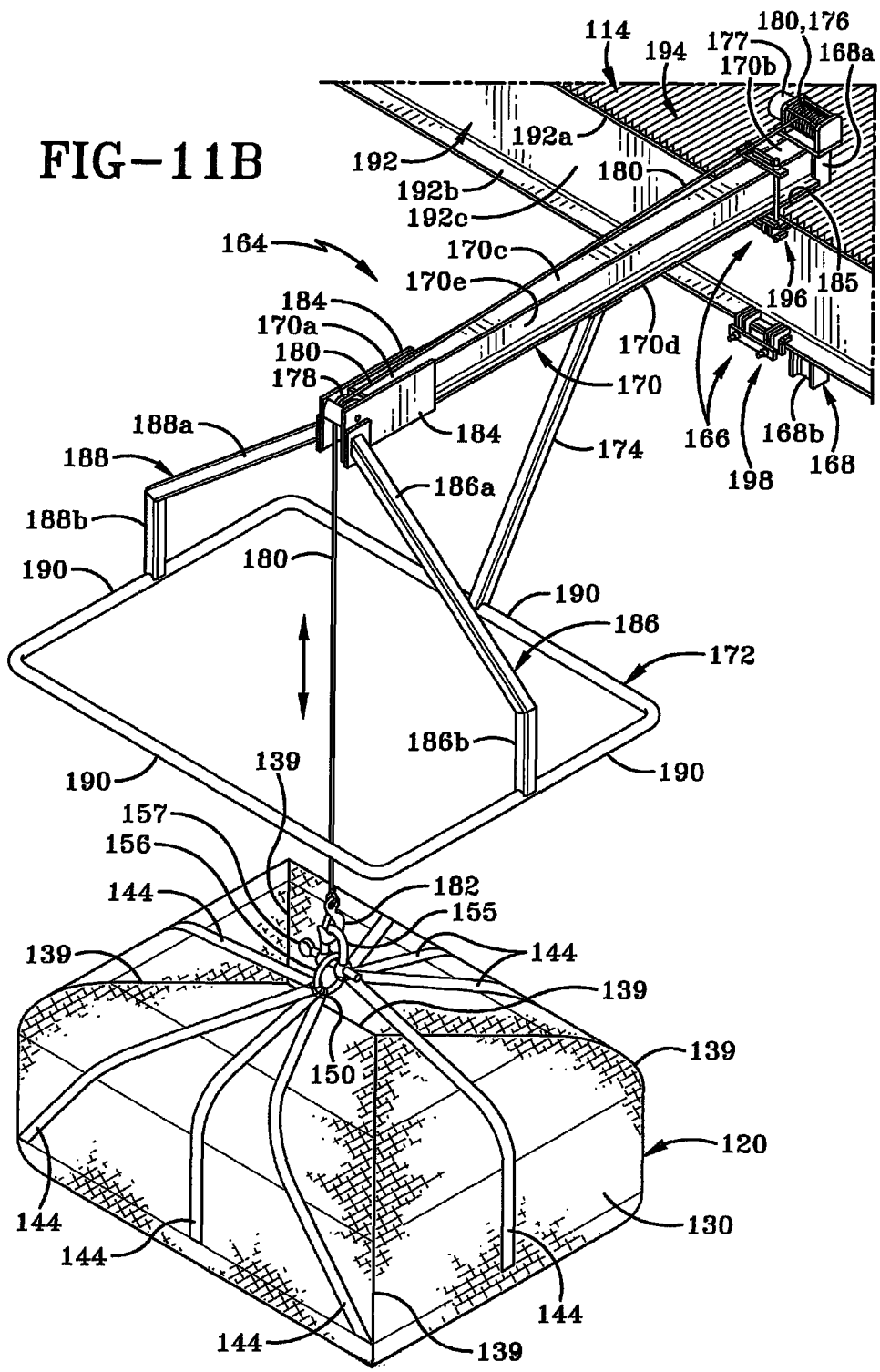

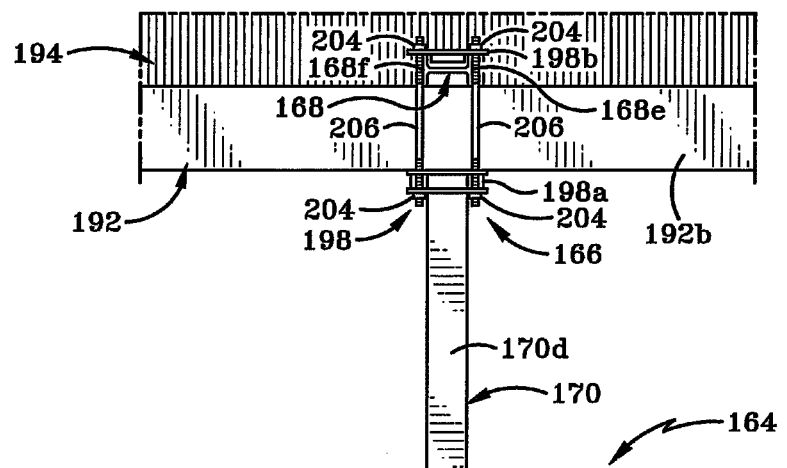
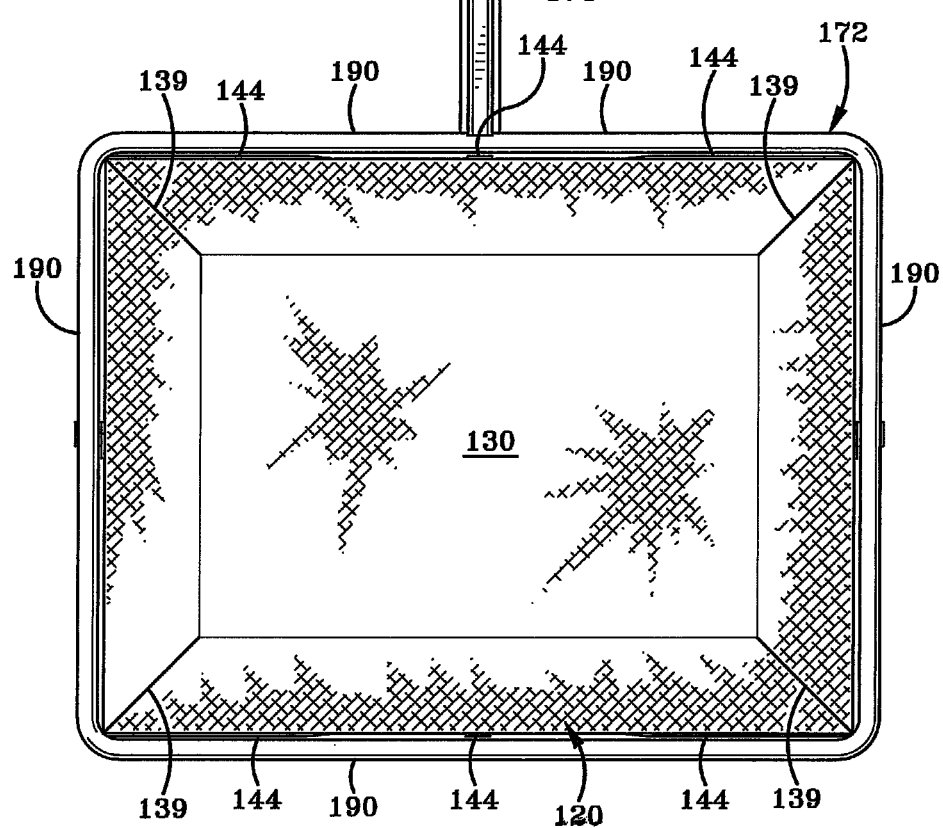
FIG-17

DEVICE FOR STORING A FLOATING OIL BOOM AND METHOD OF USING THE SAME

CROSS-REFERENCE TO RELATED APPLICATIONS

This application claims the benefit of U.S. Provisional Application Ser. No. 61/370,307, filed Aug. 3, 2010 and entitled "Device for Storing a Floating Oil Boom and Method of Using the Same", the entire specification of which is incorporated herein by reference.

BACKGROUND OF THE INVENTION

1. Technical Field

This invention generally relates to storage devices. More particularly, the invention relates to a storage device for the oil exploration industry. Specifically, the invention relates to a storage device for holding an extended length of a floating oil boom therein and to a suspension system for retaining the storage device on an oil rig or ship until it is needed in the event of an emergency, and to a method of using the same.

2. Background Information

With the recent oil spill in the Gulf of Mexico it has become evident that there is a need for drilling platforms or oil rigs, oil transportation vessels and other marine equipment used in the oil exploration industry to carry equipment to rapidly contain oil spills. This equipment needs to be available immediately so that the spread of any spilled oil can be controlled as early in the emergency as possible.

One of the most common and most effective pieces of equipment used to control oil spills in large bodes of water is the floating oil boom. Floating oil booms are typically made from a heavy-duty PVC that encloses a floatation device and includes a weight that hangs downwardly when in the water to keep the boom in a particular orientation. The boom is manufactured in sections that are folded up accordion-style and are banded together for transportation and storage. When the boom reaches the oil spill site, the banding is cut and the sections of boom are secured together to form a floating barrier that is lowered into the ocean or lake and is positioned to limit the dispersion of the spilled oil.

It would be ideal for an oil rig, for example, to keep a supply of floating oil boom on board at all times so that the boom can be deployed at a moment's notice. One of the issues in this regard is that deck space is at a premium on an oil rig and there are essentially no places on a rig to store a sufficient quantity of oil boom that could make a difference in the event of an emergency.

There is therefore a need in the art for a novel device and method for storing a quantity of floating oil boom on an oil rig or other marine vessel that makes the boom readily accessible in the event of an emergency but does not occupy valuable deck space.

SUMMARY OF THE INVENTION

The device of the present invention is a storage device for retaining an extended length of floating oil boom therein and a method of using the same. The storage device is made from a sheet of material that is foldable to define and surround an interior cavity in which the oil boom is received. A closure mechanism is engaged to secure the folded storage device about the oil boom. A lifting mechanism on the storage device is engaged with a cable extending from a suspension assembly mounted on a vessel for use on a large body of water. The suspension assembly maintains the storage boom adjacent a side wall of the vessel and a distance above the surface of the water until the oil boom retained therein is needed in an emergency.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 9 is a side elevation of a ship having a plurality of oil boom storage devices in accordance with the present invention suspended against the sides of the vessel;

FIG. 10 is a side elevation of an oil rig having a plurality of boom storage devices and suspension assemblies disposed thereon in accordance with the present invention;

FIG. 11B is a perspective view of the second embodiment of the boom storage device and a suspension assembly with the storage device shown lowered out of the frame assembly;

FIG. 17 is a bottom view of the boom storage device and suspension assembly.

DETAILED DESCRIPTION OF THE INVENTION

Figure 1:
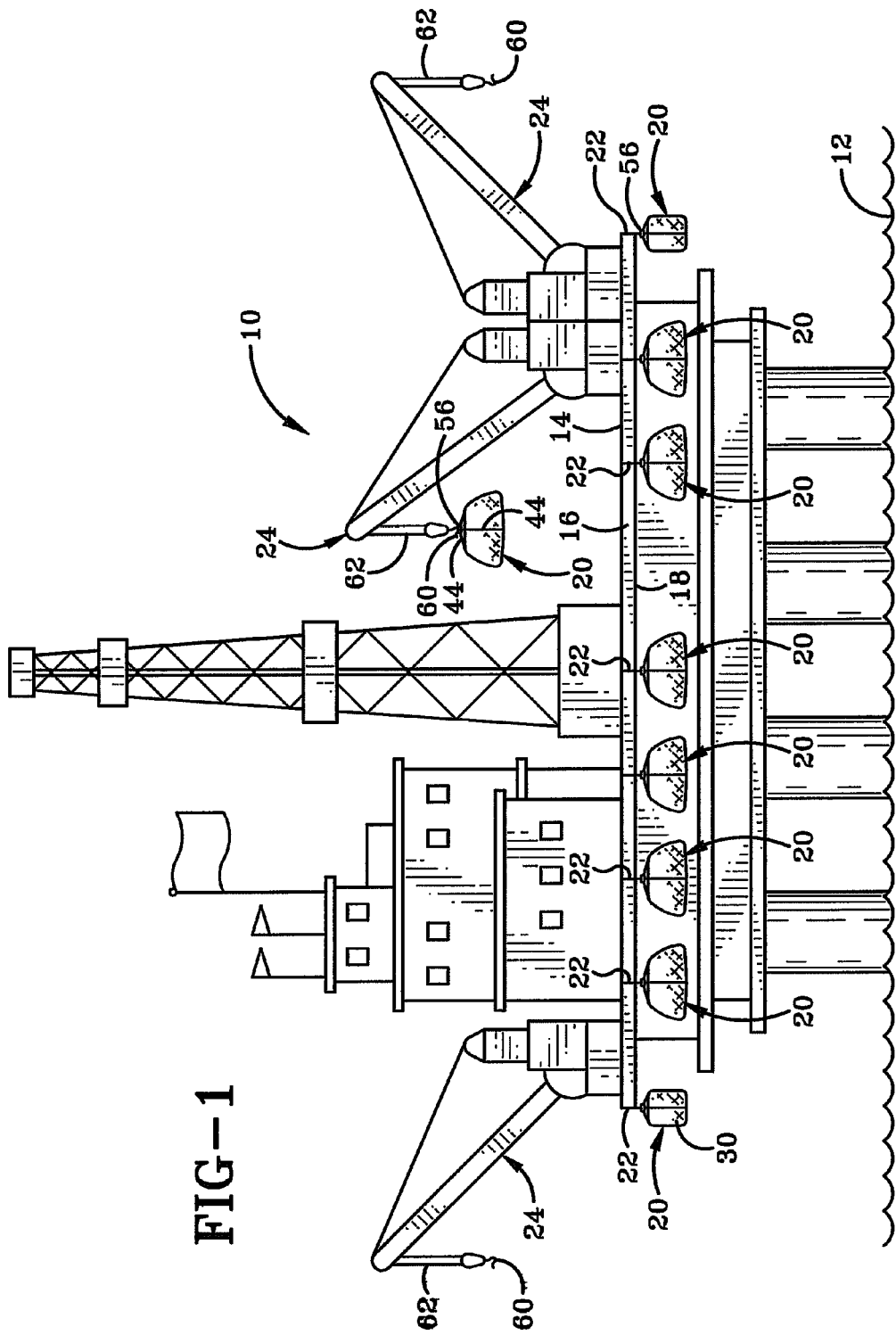
FIG. 1 is a side elevation of an oil rig having a plurality of boom storage devices in accordance with the present invention suspended around a perimeter of the rig.

Referring to FIGS. 1-8 there is shown a drilling platform or oil rig 10 standing in a large body of water such as a lake or an ocean 12. Oil rig 10 has an upper deck 14, an underside 18 and a peripheral sidewall 16 extending between deck 14 and underside 18. Underside 18 is spaced a vertical distance above the upper surface of the water. A plurality of storage devices 20 in accordance with the present invention are suspended adjacent an exterior surface of sidewall 16 by way of a cable 22. Cables 22 form part of a suspension assembly provided on rig 10. Storage devices 20 hang downwardly from sidewall 16 and are spaced a distance vertically above the upper surface of the water of ocean 12. A crane 24 extends upwardly from deck 14. Crane 24 includes a motorized extendable and retractable cable 62 that has a hook 60 on a terminal end. (It will be understood that a hand-operated winch could be used instead.) Hook 60 is selectively engageable with any one of storage devices 20 and crane 24 is used as a lifting mechanism to manipulate storage devices 20 as will be hereinafter described.

Figure 2:
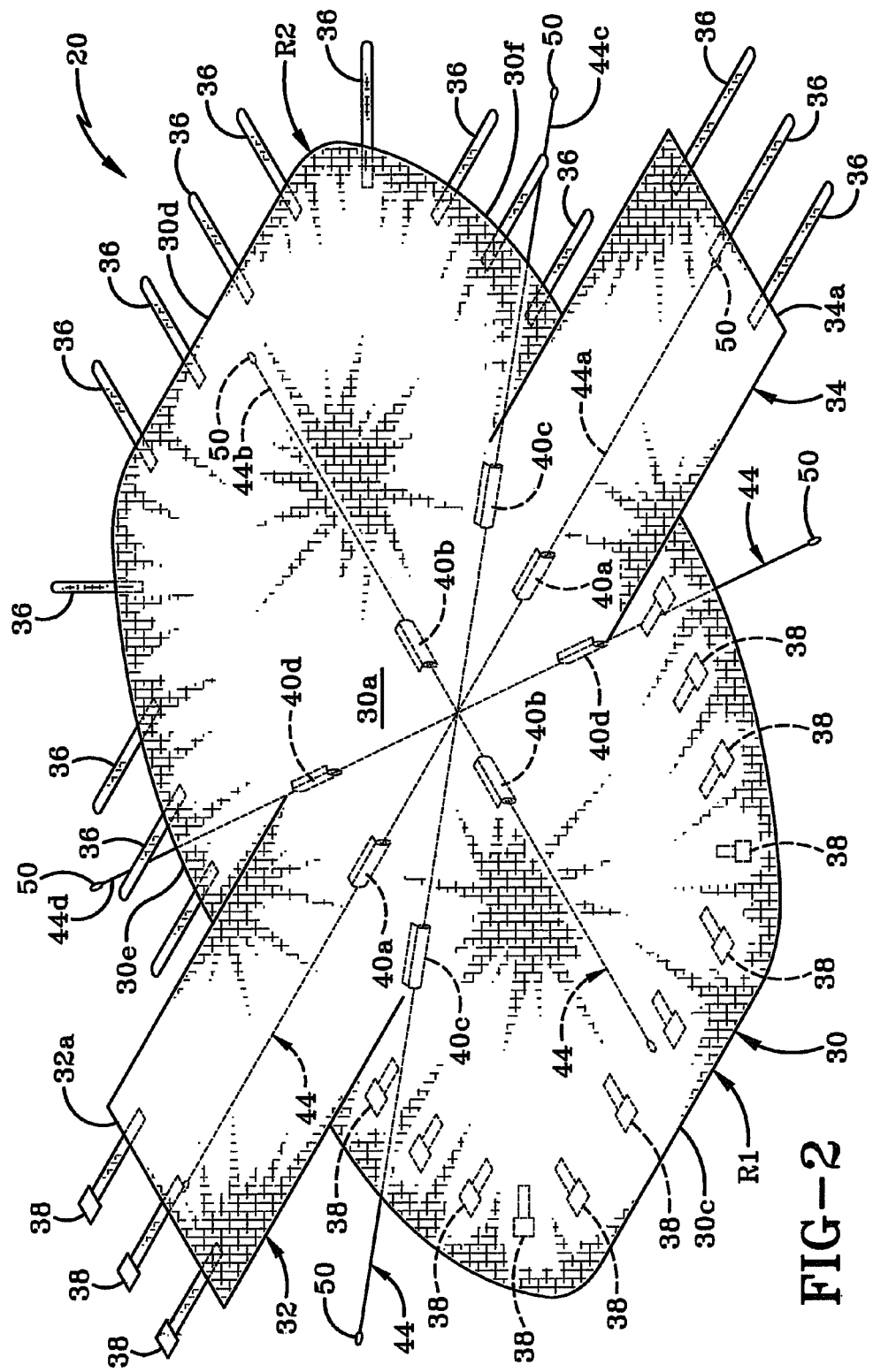
FIG. 2 is a perspective view of an individual boom storage device in accordance with the present invention shown in an open and unloaded condition.
Figure 3:
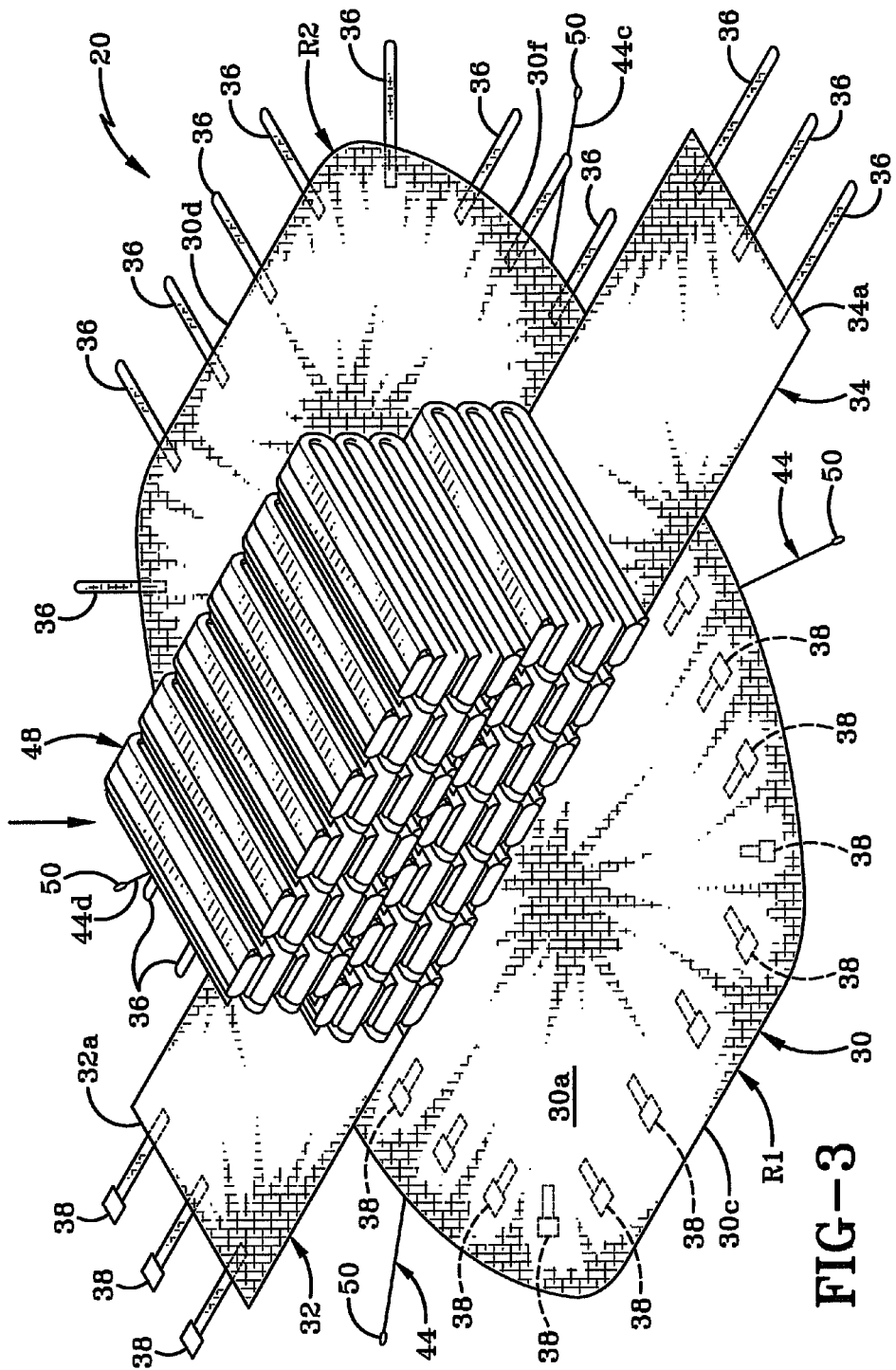
FIG. 3 is a perspective view of the storage device with a quantity of a folded floating oil boom shown stacked, accordion-style, on an interior surface of the storage device prior to closure of the same.
Figure 4:
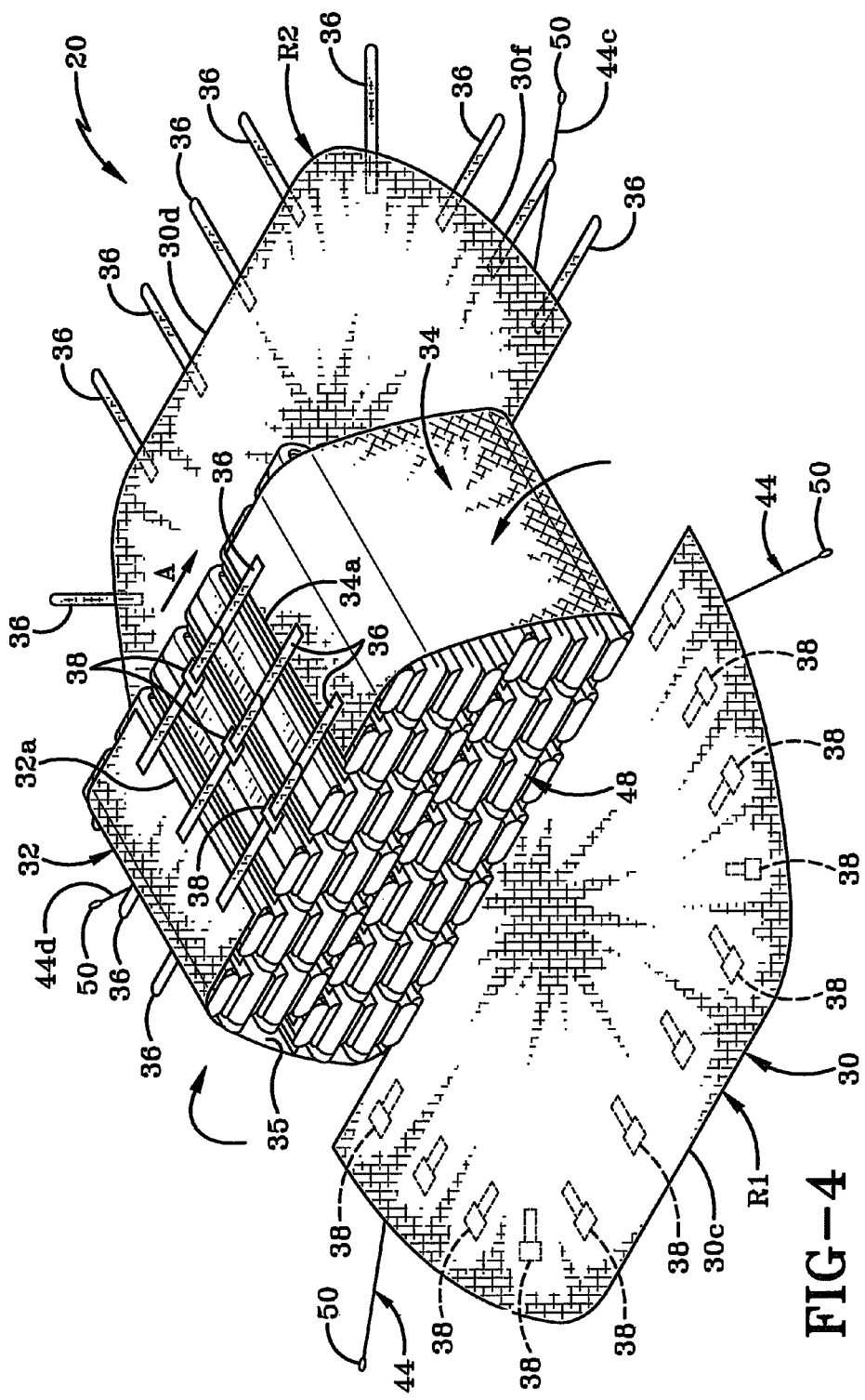
FIG. 4 is a perspective view of the storage device with the sides folded inwardly to cover a top end and sides of the stack of folded floating oil boom.

FIG. 2 shows the storage device 20 in the open condition and ready to receive a stack of floating oil boom thereon. Storage device 20 comprises a tarpaulin 30 made from a sheet of a substantially flexible and foldable material. Preferably, tarpaulin 30 is made from a sheet of a waterproof material and is shaped in the manner illustrated in FIG. 2. As disclosed later herein, tarpaulin 30 may be of any suitable shape for being folded into a storage device in accordance with the present invention, such suitable shapes including being substantially rectangular or square.

As illustrated in FIG. 2, tarpaulin 30 has an interior surface 30a, an exterior surface 30b (FIG. 8), a first edge 30c, a second edge 30d, a first side 30e and a fourth side 30f. A first flap 32 extends outwardly from first side 30e and a second flap 34 extends outwardly from second side 30f. Each of first and second flaps 32, 34 is substantially rectangular. It will be understood that other shapes of first and second flaps can be utilized without departing from the spirit of the present invention.

Tarpaulin 30 further includes a plurality of straps 36 that extend outwardly beyond the various sides and edges. Each strap 36 is secured to the exterior surface 30b by a suitable method such as by heat welding. Stitching could also be used but since this technique punctures the tarpaulin 30, a waterproof coating would ideally be provided over the stitches to stop water from entering the interior of storage device 20 once closed. In particular as illustrated, second edge 30d includes a plurality of straps 36 extending outwardly therefrom, as does a portion of first side 30e, second side 30f and second flap 34.

In accordance with yet another feature of the present invention, a plurality of fastening members 38 are secured to exterior surface 30b of tarpaulin 30 to selectively matingly engage with straps 36. Preferably, the fastening members are buckles 38 through which straps 36 may be threaded. Although not shown herein, each buckle 38 includes a mechanism for locking strap 36 in place when strap 36 is pulled in a first direction. Straps 36 may be released from buckles 38 when desired. Each buckle 38 preferably is heat welded or otherwise secured to exterior surface 30b. Buckles 38 are provided in locations that are aligned with and opposite to straps 36. So, for example, a plurality of buckles 38 are provided on first edge 30c that align with the straps 36 on second edge 30d, and are provided on first flap 32 to align with straps 36 on second flap 34.

Figure 8:
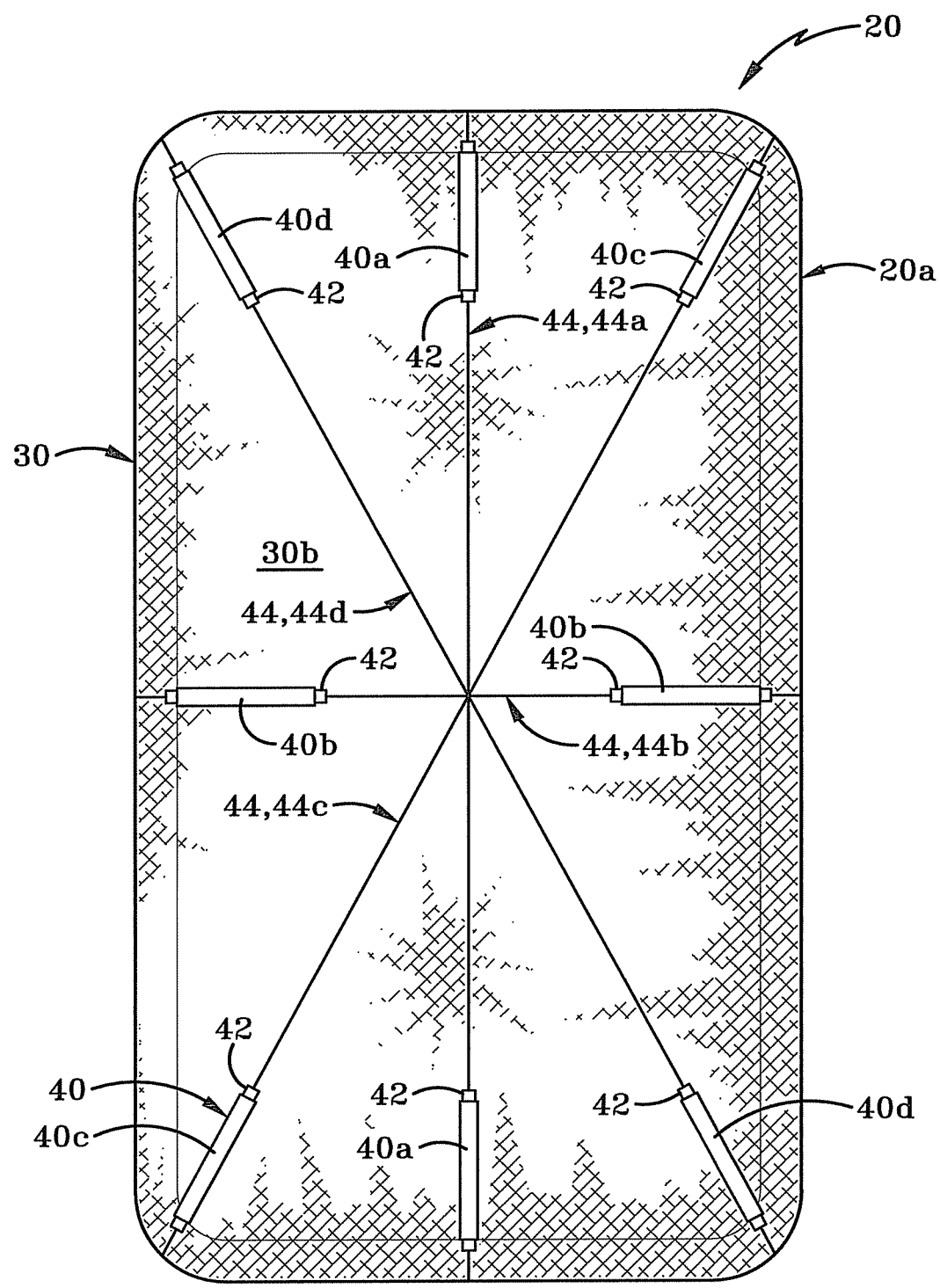
FIG. 8 is a bottom view of the storage device showing the cables passing through sleeves disposed on the underside of the storage device.

In accordance with yet another feature of the present invention and as illustrated in FIGS. 2 & 8, tarpaulin 30 is provided with a plurality of tubular sleeves 40 (FIG. 8) that are heat-welded or otherwise secured to exterior surface 30b. Sleeves 40 are positioned in spaced apart yet aligned pairs. A first pair of sleeves 40a (FIG. 2) is aligned with each other along an axis that extends from first edge 30c to second edge 30d. A second pair of sleeves 40b is aligned with each other along an axis that extends from first side 30e to second side 30f. A third pair of sleeves 40c is aligned with each other along a diagonal that extends from the corner at the junction of first edge 30c and first side 30e to the corner at the junction of second edge 30d and second side 30f. Finally, a fourth pair of sleeves 40d is aligned with each other along a diagonal that extends from the corner at the junction of first edge 30c and second side 30f to the corner at the junction of second edge 30d and first side 30e.

Sleeves 40 preferably are formed from a rectangular piece of the tarpaulin sheet material that is folded together and then secured along an elongated edge to exterior surface 30b of tarpaulin 30. Although not shown herein, each sleeve 40 is generally tubular in shape and defines a bore therein having an opening at each end. A tubular member 42 (FIG. 8), preferably made from a durable plastic, is inserted into the bore of each sleeve 40. Preferably, tubular member 42 is of a slightly greater length than is each sleeve 40 and, consequently, a section of the associated tubular member 42 extends outwardly beyond each edge of sleeve 40.

In accordance with yet another feature of the present invention, a cable 44 (FIG. 5) preferably made of steel, is threaded through each aligned pair of sleeves 40. Thus, a first steel cable 44a (FIG. 8) is threaded through aligned sleeves 40a, a second steel cable 44b is threaded through aligned sleeves 40b, a third steel cable 44c is threaded through aligned sleeves 40c, and a fourth steel cable 44d is threaded through aligned sleeves 40d.

It will be understood that fewer or more straps 36, buckles 38, sleeves 40 (and corresponding tubular members 42), as well as cables 44 may be utilized as part of the storage device 20 without departing from the spirit or scope of the present invention.

FIG. 9 illustrates a second type of vessel that the storage device 20 of the present invention may be used on. In this instance, the vessel is a boat or ship 26 that is used on the large body of water, such as ocean 12. Ship 26 has a sidewall 28, at least a portion of which is disposed a spaced distance above the upper level of the water. A crane 24 extends upwardly from an upper deck (not shown) of ship 26 and includes an extendable and retractable cable 62 with a hook 60 at its terminal end. A plurality of storage devices 20 in accordance with the present invention are suspended adjacent an exterior surface of sidewall 28 of ship 26 from a securement system that includes cables 22. When so suspended, storage devices hang downwardly from cables 22 a spaced distance vertically above the upper surface of ocean 12.

Storage device 20 is used in the following manner. The tarpaulin 30 is placed exterior surface 30b down onto a flat surface. A plurality of folded smaller lengths of floating oil boom 46 (FIG. 3) are placed one on top of the other on a generally central region of interior surface 30a of tarpaulin 30, thereby forming a stack 48. First flap 32 and second flap 34 are folded inwardly over the sides of stack 48 and over a portion of top of stack 48. Straps 36 on second flap 34 are threaded through buckles 38 on first flap 32 and then pulled in the direction of arrow "A" (FIG. 4) to tightly secure first and second flaps 32, 34 around the sides and the top of stack 48 of oil booms 46. When so folded, first and second flaps 32, 34 begin to bound and define an interior cavity 35 (FIG. 4) within storage device 20 for retaining stack 48 therein.

A first region R1 (FIG. 4) of tarpaulin 30 adjacent first edge 30c is then folded over the exterior surface 30b of the secured first and second flaps 32, 34. First region R1 abuts a front portion and a top portion of stack 48 and covers at least part of first and second flaps 32, 34 and the tightened straps 36 and buckles 38 thereon. A second region R2 of tarpaulin 30 adjacent second edge 30d is then folded over a rear portion and part of a top portion of stack 48 and covers at least part of first and second flaps 32, 34 and part of first region R1. Thus, first and second regions R1, R2 at least partially overlap each other and overlap first and second flaps 32, 34. Straps 36 on first and second regions R1, R2 are engaged with the mating buckles 38 and straps are pulled in the direction of arrows "B" (FIG. 5) to tightly enclose the front and the back of stack 48. First and second regions R1, R2 are the other members of tarpaulin 30 that surround and define interior cavity 35 within which stack 48 is retained.

Figure 5:
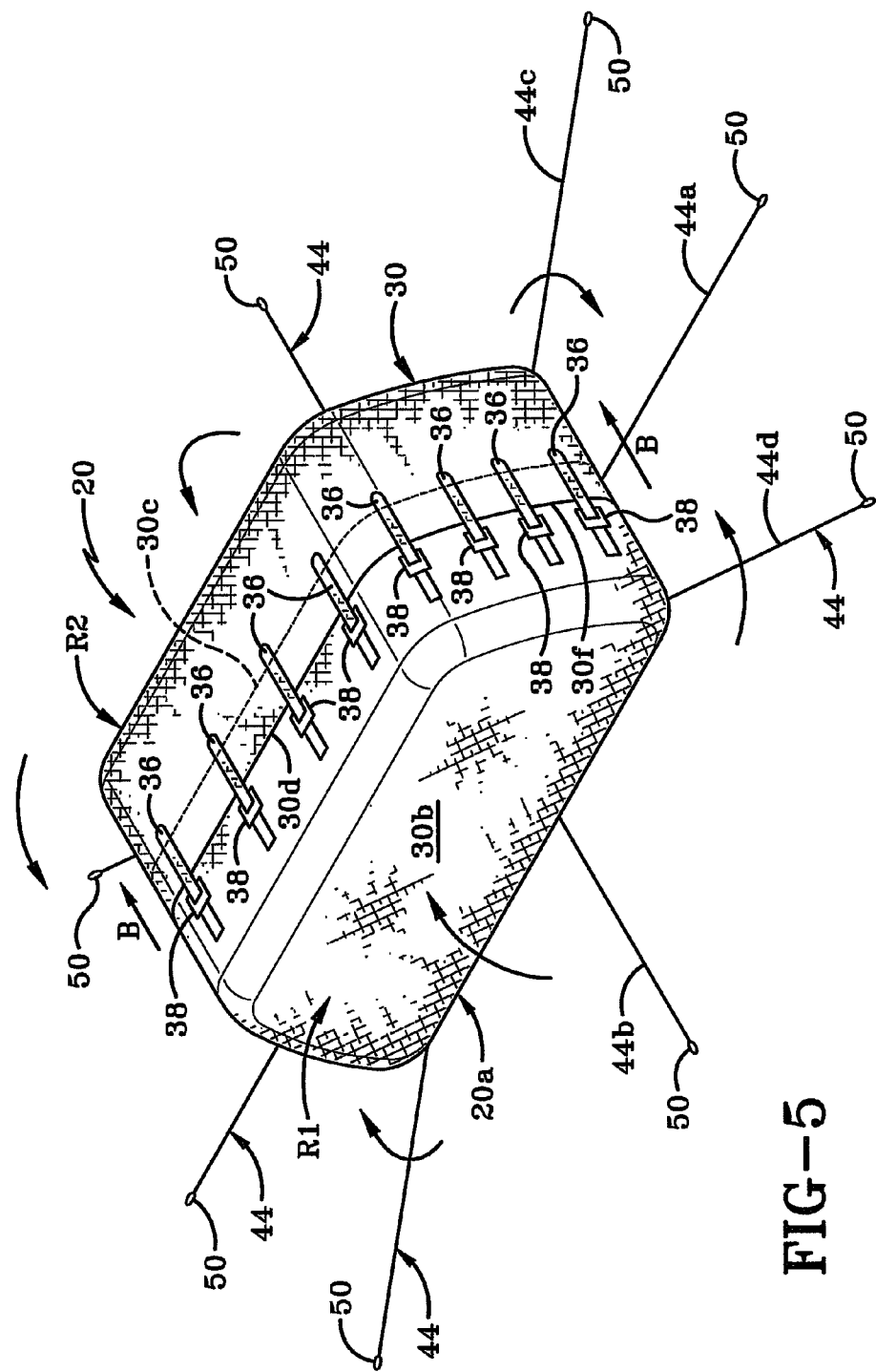
FIG. 5 is a perspective view of the storage device with the front and back folded inwardly over the sides to completely enclose the stack of floating oil boom.
Figure 6:
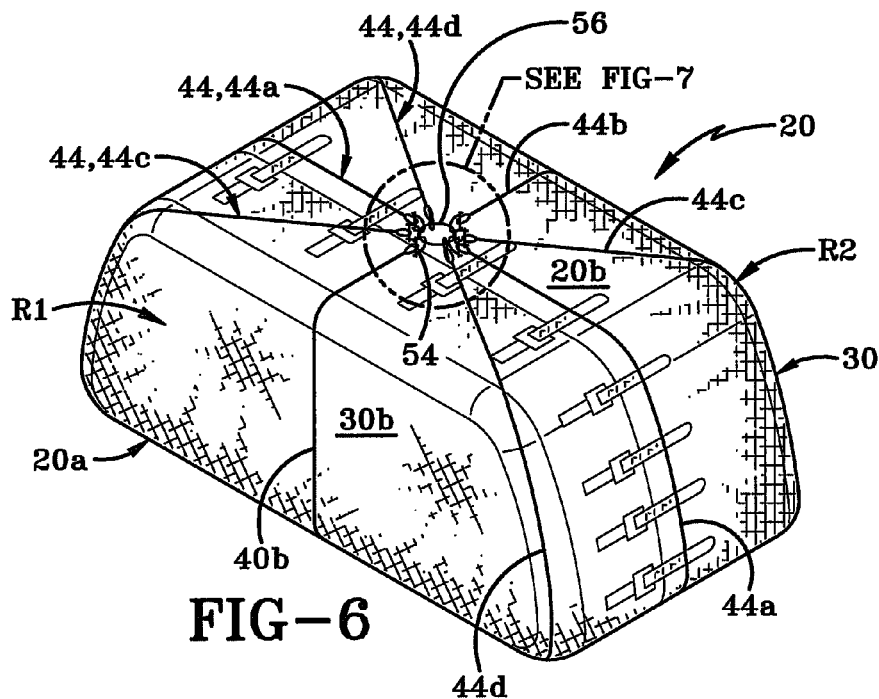
FIG. 6 is a perspective view of the storage device in the completely closed position showing the steel cables secured around the storage device and locked to an O-ring.
Figure 7:
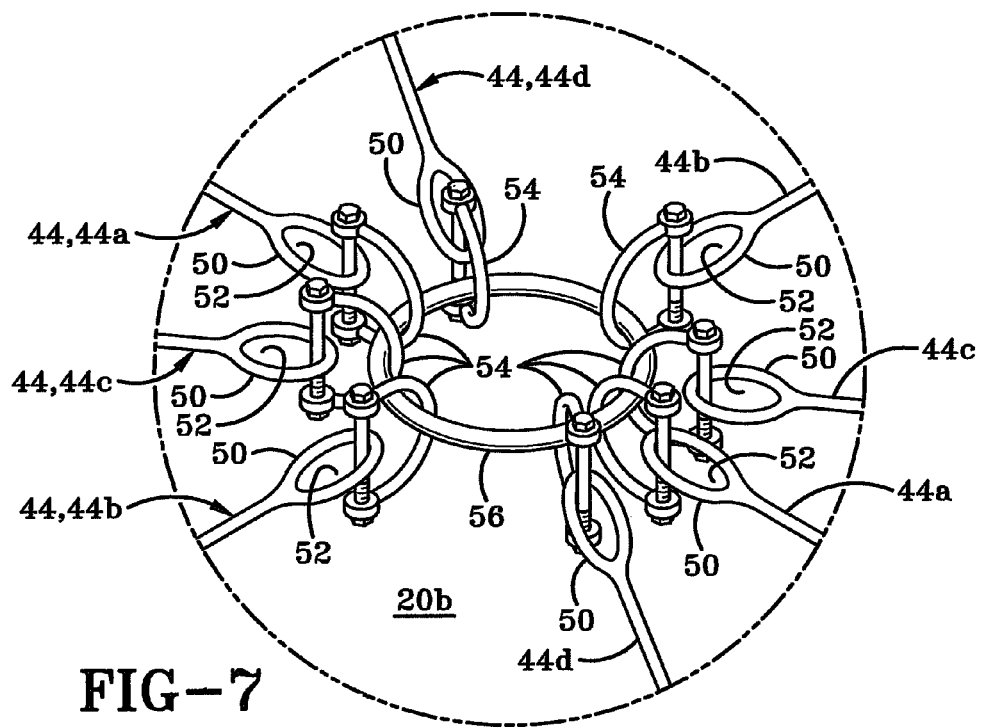
FIG. 7 is an enlarged perspective view of the highlighted region of FIG. 6.

At this stage, as shown in FIG. 5, cables 44a-44d radiate outwardly beyond the edges 20a of the folded container 20. Each cable 44 preferably is manufactured from wound steel and includes a looped region 50 at each end. Each looped region 50 defines an opening 52 therein. Each cable 44a-44d is wrapped around a peripheral portion of the closed and secured storage device 20. A D-shaped connector 54, such as a clevis pin, is used to secure each looped region 50 of each wrapped cable 44 to a steel O-ring 56. The O-ring 56 is positioned so as to be located generally centrally on the uppermost surface 20b (FIG. 6) of storage device 20 when it is in the fully closed and secured position.

The fully folded, secured and cable-wrapped storage device 20 is then transported to the oil rig 10 or ship 26 on which it is to be stored for emergency purposes. Typically, oil rig 10 or ship 26 will include some type of cable system 58 that is mounted on or adjacent sidewall 16 of rig or sidewall 28 of ship 26. Cable system 58 includes a plurality of shorter length cables 22 that are each selectively attached to an O-ring 56 on one of a plurality of storage devices 20. Cables 22 may be threaded through O-ring 56 and then secured back to themselves or to another component on cable system 58. Alternatively, cables 22 may be secured to O-ring 56 in much the same manner as cables 44. Once storage devices 20 are secured to cable system 58, crane 24 is used to move each individual storage device 20 from a position on the upper deck 14 of rig 10, for example, to a storage position. This is done by engaging O-ring 56 on storage device using hook 60 at the end of cable 62 on crane 24. Cable 62 is retracted in such a manner as to raise storage device 20 off upper deck 14 of rig 10, for example. Crane 24 then shifts storage device 20 laterally so that it is situated some distance above the upper surface of the water. Cable 62 is then extended so that storage device 20 is lowered below the upper surface of deck 14 and is effectively hanging suspended from cable 22. Hook 60 is then detached from O-ring 56 on storage device 20 and cable 22 then supports storage device 20 adjacent sidewall 16 of rig 10 or ship 26. Each storage device 20 is moved off deck 14 and into a storage position where they hang adjacent sidewall 16 and over the top surface of the water. Storage devices 20 preferably hang freely from cables 22. It is also possible, however, that the type of securement system to which storage devices 20 are secured could also hold the plurality of storage devices 20 tightly against the sidewall 16, 28 of rig 10 or ship 26 so that the storage devices are not able to swing back and forth in the wind or as the ship 26 moves through the water.

It will further be understood that storage devices 20 may be secured in other locations on the rig 10 or ship 26, without departing from the spirit of the present invention. For example, storage devices 20 may be suspended from the underside 18 of rig 10.

The overall final shape and the closure order of the various sections of tarpaulin 30 preferably are such that water from rain or the ocean 12 slides off the top and sides of folded and secured storage device 20. The sections of the storage device 20 that are fastened by straps 36 and buckles 38 preferably overlap each other to a fairly substantial extent. Buckles 38 therefore preferably are located some distance inwardly away from the peripheral outer edges and sides 30c, 30d, 30e and 30f of tarpaulin 30, such as is illustrated in FIG. 2. When storage device 20 is folded and secured, there is nowhere for water to seep into the interior cavity 35 of storage device 20. If water were to get into interior cavity 35, it would not harm the floating oil boom 46 as the oil boom is waterproof. The water would, however, tend to increase the overall weight of storage device 20 and thus potentially strain cable 22 from which storage device 20 is suspended.

If it is necessary to deploy an oil boom barrier in the event of an oil spill, the crane 24 is used to raise storage device 20 from its storage position adjacent sidewall 16 and back onto the deck 14 of rig 10. Connectors 54 are disengaged from O-ring 56 and cables 44a-44d are unwrapped from around storage device 20. The straps 36 are unbuckled from buckles 38 and the various sections of storage device 20 are unfolded until tarpaulin 30 is back in the position shown in FIG. 2. The stack 48 of oil boom sections 46 is then removed from tarpaulin 30, and the oil boom sections 46 are connected together in any suitable way known in the art. The expended length of floating oil boom, made up from the smaller lengths of the oil boom that have been connected together is then deployed into the ocean. Once the oil boom sections are removed from tarpaulin 30, the tarpaulin may simply be folded up and stored away in a relatively small space. The folded up tarpaulin may also be shipped back to a remote location for restocking with new smaller length oil boom sections 46 at a later date. It will be understood that storage device 20 preferably is designed to retain about 500 feet of folded floating oil boom within its interior cavity 35, with each of the smaller sections being of length that is around 50 feet long.

It will further be understood that tarpaulin 30 may be manufactured to be substantially free of one or both of first and second flaps 32, 34 and therefore be substantially rectangular or square in shape. Tarpaulin 30 may, alternatively, be elliptical, circular or of any other peripheral shape that permits it to be folded to form an interior cavity that can retain a stack of floating oil boom lengths therein. It will further be understood that the stack of floating oil boom lengths can be arranged in any shape that is complementary to the way that the tarpaulin 30 is to be folded. The isosceles trapezoidal shape of storage device 20 as illustrated herein in FIG. 5 is by way of example only and should not be considered to be limiting to the scope of the present invention. However, the inclined sides of the storage devices 20 as illustrated in FIG. 5 enable water to sheet easily off storage device 20 when it is suspended in its storage position.

Figure 11A:
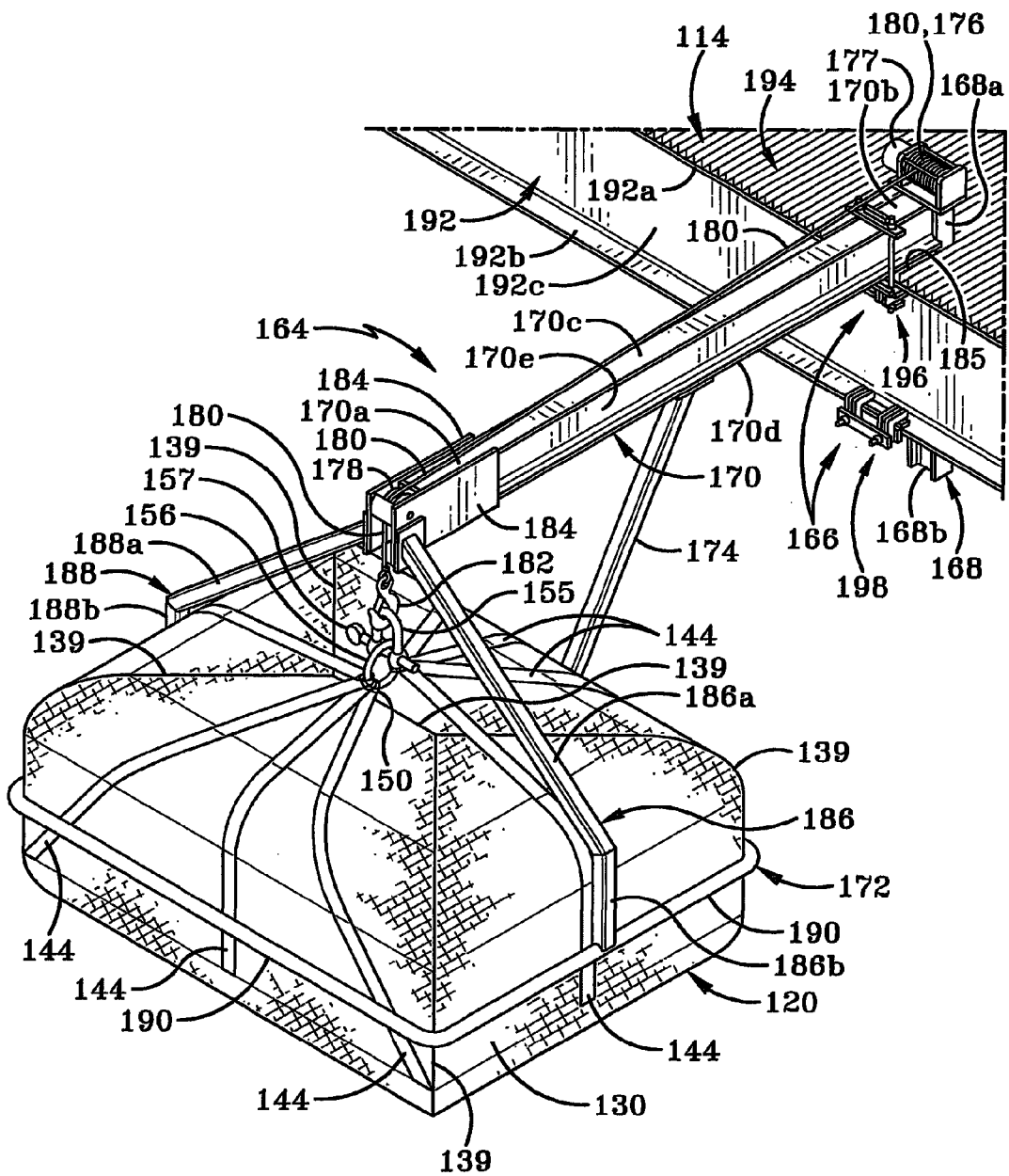
FIG. 11A is a perspective view of a second embodiment of a boom storage device and a suspension assembly with the storage device shown retained within the frame assembly thereof.
Figure 12:
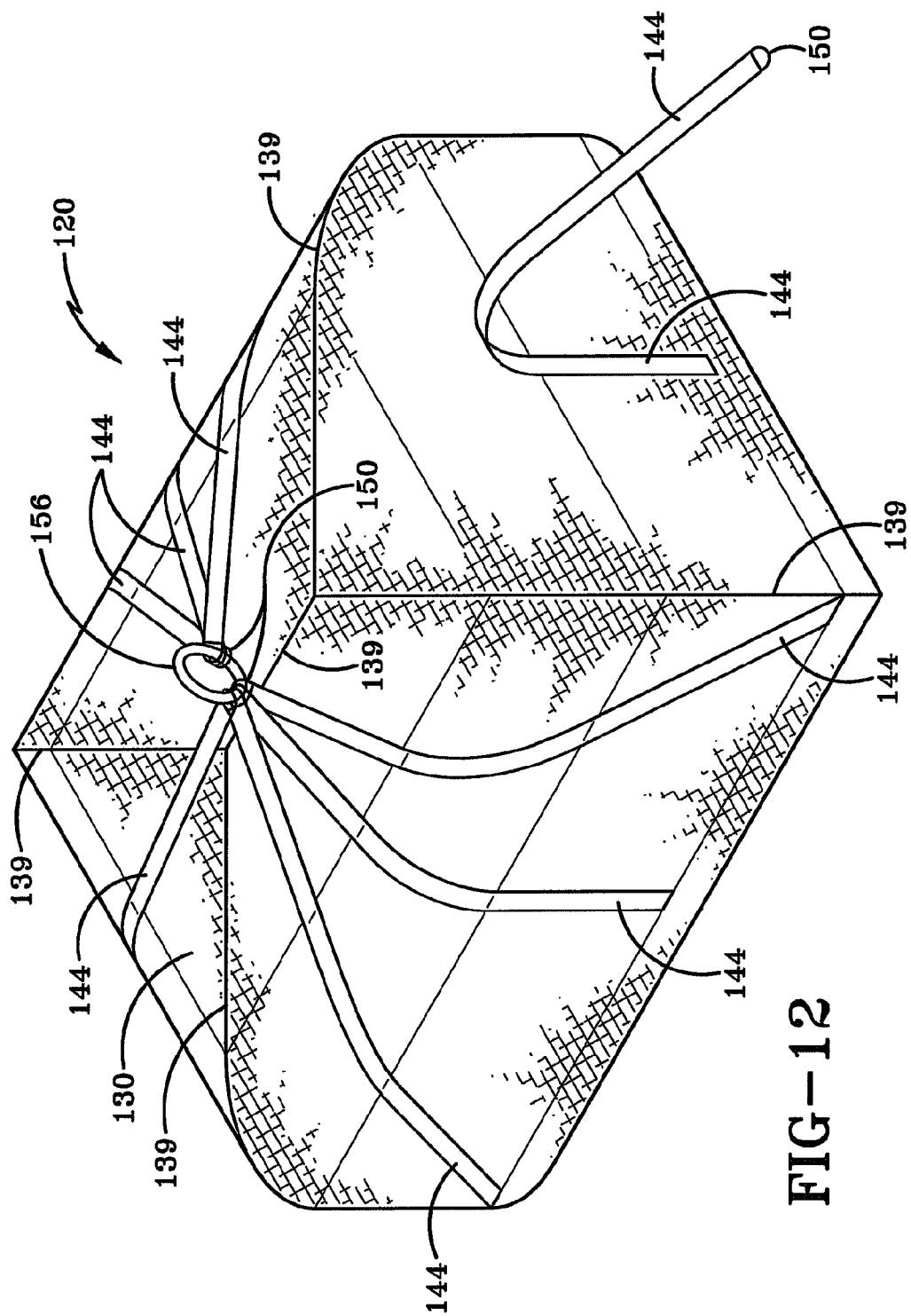
FIG. 12 is a perspective view of the boom storage device of FIG. 11, shown in a loaded and closed condition.

FIGS. 10-18 show a second embodiment of a boom storage device in accordance with the present invention and generally indicated at 120. In this second embodiment of the invention, storage device 120 preferably is configured to contain an entire floating oil boom as opposed to just a section thereof as was the case with storage device 20. FIG. 10 shows an oil rig 110 having a plurality of storage devices 120 secured thereto. Each storage device is shown engaged with a suspension assembly 164 in accordance with the present invention. In accordance with the present invention, suspension assembly 164 comprises a cantilevered crane that is configured to be mounted on oil rig 110 and will be described further herein. Although not illustrated herein, it will be understood that suspension assembly 164 may similarly be used on a ship or other vessel for use on a large body of water. Preferably, suspension assembly 164 is configured to be mounted on an I-beam 192 that comprises a region of one of the deck 114 (FIG. 10), sidewall 118 or any other suitable region of oil rig 110, and to remain engaged therewith on a substantially permanent basis. More particularly, suspension assembly 164 is configured to be secured to I-beam 192 in a manner that requires no welding or torching. Specifically, suspension assembly 164 is secured to I-beam 192 by way of a clamping mechanism 166 (FIG. 11). It will be understood that even though suspension assembly 164 is designed to remain essentially permanently mounted on I-beam 192, it can be removed therefrom if desired by simply disengaging clamping mechanism 166. Again, the removal of suspension assembly 164 requires no welding or torching.

Referring to FIG. 11, storage device 120 is manufactured from a flexible sheet of material, such as a tarpaulin, that is of any suitable shape, such as rectangular or square. The sheet material is foldable to create an interior cavity in the same manner as indicated with reference to storage device 20. Storage device 120 differs from storage device 20 in that it includes a different mechanism for securing the sheet material in a folded condition about a floating oil boom (not shown in FIG. 11). Instead of the straps 36 and buckles 38 used in storage device 20, storage device 120 is a tarpaulin 130 that is closed by way of one or more zippers 139. It will be understood that any other suitable fastening mechanism such as snaps, clips etc. may be used without departing from the scope of the present invention.

Storage device 120 is also provided with a lifting assembly. The lifting assembly includes a plurality of lifting straps 144, D-clips 150, a steel ring 156 and clevis 155. A plurality of lifting straps 144 are provided on storage device 120 instead of the cables 44 that were provided on storage device 20. Lifting straps 144 are sewn, heat sealed or otherwise secured to an exterior surface of the sheet material. Any suitable number of lifting straps 144 may be provided on storage device 120 that will adequately enable storage device 120 to be raised or lowered by suspension assembly 164 without becoming unstable. Lifting straps 144 preferably are made from a nylon weave fabric, similar to that used to manufacture seat belts. A metal D-clip 150 is sewn onto a free end of each lifting strap 144. Steel ring 156 engages the plurality of D-clips 150, drawing them and the lifting straps toward each other and toward a central region on an uppermost surface of storage device 120. Clevis 155 engages ring 156 and is securable to a hook 182 of suspension assembly as will be hereinafter described.

Referring to FIGS. 11-17 and in accordance with a particular feature of the present invention, suspension assembly 164 includes an upright 168, an arm 170, a frame assembly 172, a stabilizing bar 174, a first pulley 176, a second pulley 178, a crane cable 180, and a hook 182. Upright 168 has a top end 168a and a bottom end 168b. Bottom end 168b is configured to be received within a notch 185 in deck 114 of oil rig 110. Upright 168 preferably is generally square in cross-sectional shape and includes a front surface 168c, a rear surface 168d and side surfaces 168e, 168f. It will, of course, be understood that upright 168 may be of any other cross-sectional shape without departing from the scope of the present invention. For example, upright 168 may be hexagonal in cross-sectional shape or may be generally circular with a flat front surface so that it may be oriented in hole 185 in a particular way.

Arm 170 is welded or otherwise secured to upright 168 proximate the top end 168a thereof. Arm 170 has a first end 170a, a second end 170b, a top 170c, a bottom 170d and sides 170e. One or more reinforcing plates 184 preferably are welded or otherwise secured to at least first end 170a of arm 170. Arm 170 is disposed substantially at right angles to upright 168 and extends outwardly therefrom for a sufficient distance that when upright 168 is received in notch 185, a first end 170a thereof is spaced a distance from the sidewall (not shown in these figures) of rig 110. First pulley 176 is mounted at second end 170b of arm 170 and second pulley 178 is mounted at first end 170a thereof. First and second pulleys 176, 178 are oriented so that they rotate about axes that are substantially at right angles to the longitudinal axis "Y" (FIG. 13) of arm 170. Crane cable 180 is wound around both of first and second pulleys 176, 178 and terminates in hook 182. Although not illustrated herein, it will be understood that first pulley 176 may be operationally engaged with a motor 177 to drive rotation of first pulley 176 and second pulley 178 may simply be a follower that rotates in response to movement of crane cable 180. Alternatively, both of first and second pulleys 176, 178 may be operationally engaged with motor 177. Even further, single pulley 176 may be manually operable.

Figure 14:
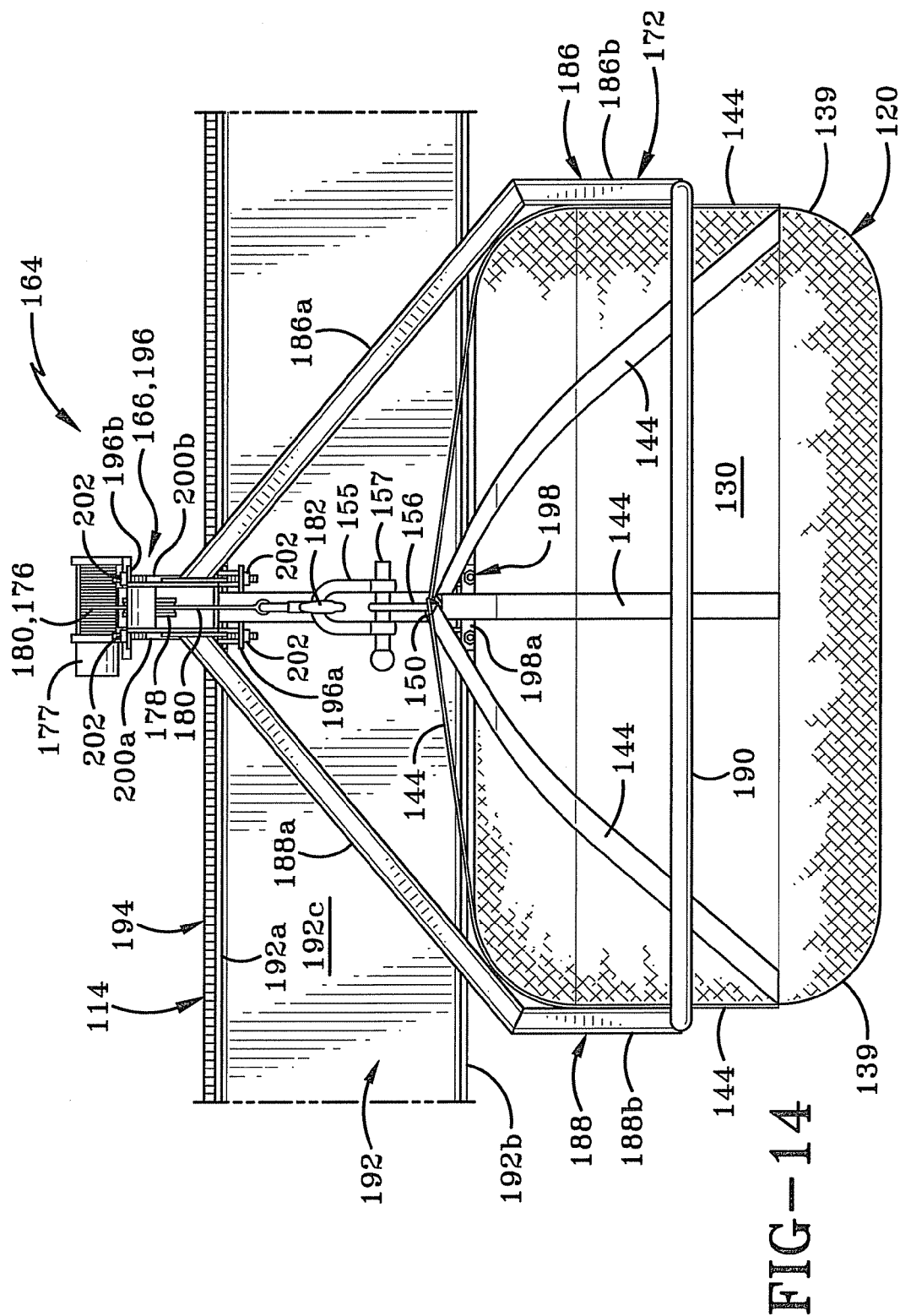
FIG. 14 is a front view of the boom storage device and suspension assembly.
Figure 15:
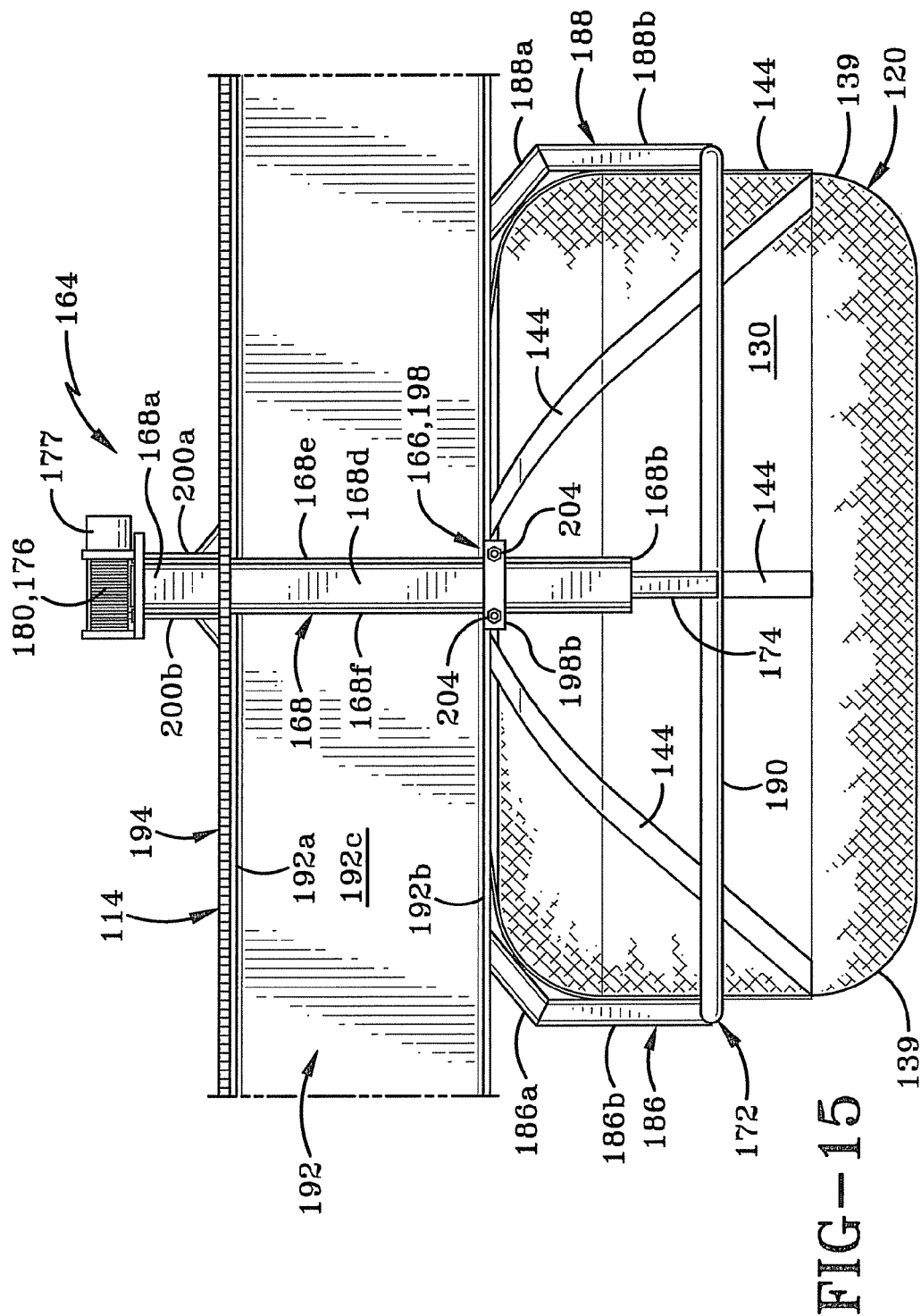
FIG. 15 is a rear view of the boom storage device and suspension assembly.
Figure 16:
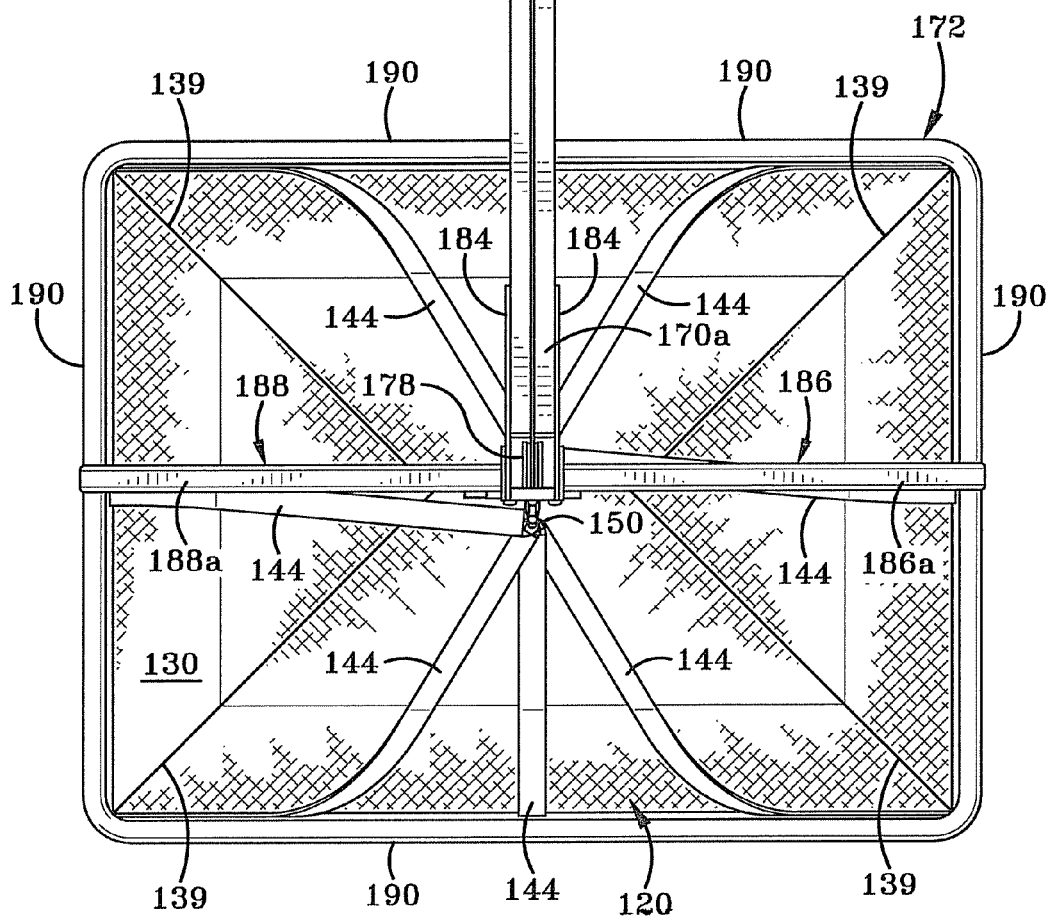
FIG. 16 is a top view of the boom storage device and suspension system.

In accordance with yet another specific feature of the present invention, frame assembly 172 extends outwardly and downwardly from first end 170a of arm 170. Frame assembly 172 comprises first and second struts 186, 188 that are welded or otherwise secured at a first end to first end 170a of arm 170. Specifically, first strut 186a is secured to first side 170e of arm 170 and second strut 188 is secured to second side 170f of arm 170. FIG. 14 shows that first strut 186 comprises a first member 186a and a second member 186b. First member 186a is secured to first side 170e of arm 170 and extends outwardly therefrom at an angle of about 45°. Second member 186b extends outwardly from a second end of first member 186a at an angle of about 135°. Consequently, second member 186b is substantially parallel to first side 170e of arm 170. Similarly, second strut 188 comprises a first member 188a and a second member 188b. First member 188a is secured to second side 170f of arm 170 and extends outwardly therefrom at an angle of about 45°. Second member 188b extends outwardly from a second end of first member 188a at an angle of about 135°. Consequently, second member 188b is substantially parallel to second side 170f of arm 170 and is substantially parallel to second member 186b of first strut 186. Frame assembly 172 further comprises one or more support members 190 that are welded or otherwise secured to the free ends of first and second struts 186, 188. Support members 190 are provided to create a closed loop that will surround and contain storage device 120. In the preferred embodiment of the invention illustrated in the attached figures, storage device 120 is substantially rectangular in shape when viewed from the top or the bottom. Consequently, support members 190 are secured together to create a substantially rectangular loop that surrounds and contains storage device 120 therein. It will be understood that if storage device 120 was of a different shape, for example if it was square when viewed from the top and bottom, then support members 190 would form a substantially square loop. FIG. 16 shows that the closed loop comprises four support members 190 that are welded or otherwise secured together to form the rectangular loop that surrounds and contains storage device 120 therein.

In accordance with yet another feature of the present invention, stabilizing bar 174 extends outwardly and downwardly from bottom surface 170d of arm 170 and is secured to one of support members 190. Bar 174 preferably is disposed at an angle of about 45° relative to bottom surface 170d of arm 170. Bar 174 aids frame assembly 172 in holding storage device 120 in a particular orientation relative to the side of oil rig 110. Bar 174 substantially prevents storage device 120 from swinging back-and-forth and up-and-down in response to wind. If suspension assembly 164 and storage device 120 are utilized on a ship, stabilizing bar 174 aids in holding storage device 120 substantially stationary relative to the side of the ship as it moves through the water.

Figure 13:
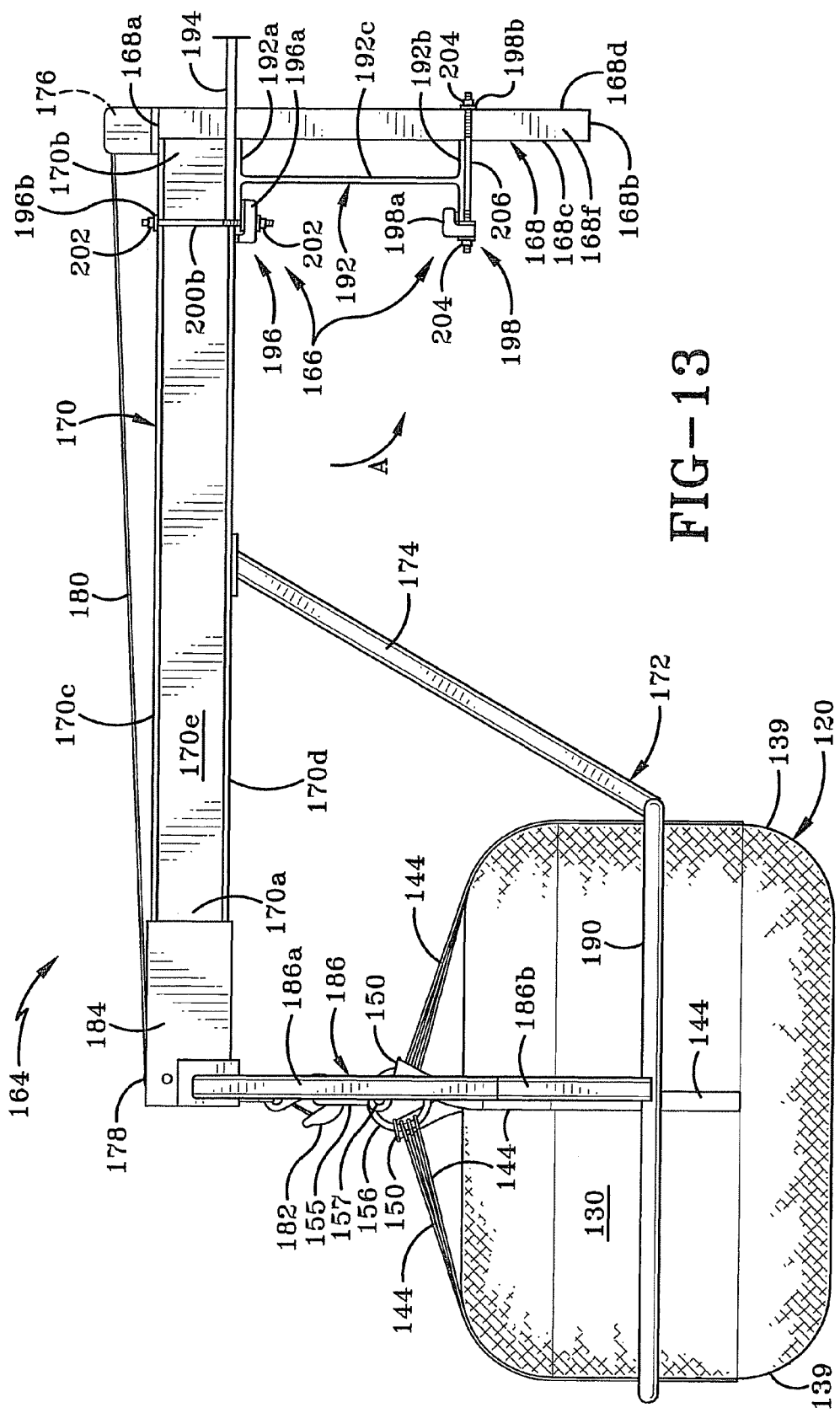
FIG. 13 is a side view of the boom storage device and suspension assembly of FIG. 11.

In accordance with yet another feature of the present invention, clamping mechanism 166 is provided to secure suspension assembly 164 to oil rig 110. Specifically, clamping mechanism 166 is designed to engage an I-beam 192 that forms part of the structure of oil rig 110. The I-beam 192 includes a pair of opposed flanges 192a, 192b and a web 192c that extend therebetween. A grating 194 is welded or otherwise secured to flange 192a and forms part of the floor structure of rig 110. Only a small portion of grating 194 is illustrated in the attached figures. Clamping mechanism 166 comprises a first clamp 196 and a second clamp 198. Only the components of first clamp 196 will be described herein but it will be understood that second clamp 198 is substantially identical in structure and function. Referring to FIGS. 13 and 14, first clamp 196 includes first and second jaws 196a, 196b, a pair of long bolts 200a, 200b extending between the jaws, and a plurality of nuts 202. Nuts 202 are threaded onto bolts 200a, 200b and are rotated to reduce the distance between first and second jaws 196a, 196b. First jaw 196a of first clamp 196a engages flange 192a of I-beam 192 and second jaw 196b engages top surface 170c of arm 170. Bolts 200a, 200b are disposed parallel to sides 170e, 170f of arm 170. Tightening of nuts 202 secures arm 170 to flange 192a of I-beam 192. Similarly, a first jaw 198a of second clamp 198 engages flange 192b of I-beam 192 and second jaw 198b thereof engages rear surface 168d of upright 168. When nuts 204 are threaded onto bolts 206, second clamp 198 clampingly secures upright 168 to second flange 192b. It will be understood that any suitable type of clamp could be used in place of those illustrated in the attached figures.

The positioning of the various components of suspension assembly 164 is such that I-beam 192 will effectively prevent rotation of arm 170 in the direction indicated by arrow "A" in FIG. 13 and, consequently, suspension assembly 164 will securely retain storage device 120 in a particular orientation relative to the side of rig 110 as represented by I-beam 192.

Suspension assembly 164 is used in the following manner. Suspension assembly 164 is engaged with oil rig 110 by inserting a portion of upright 168 through holes in grating 194 and deck 114 adjacent I-beam 192. First and second clamps 196, 198 are engaged with arm 170 and upper flange 192a of I-beam, and upright 168 and lower flange 192b of I-beam 192, respectively, so that suspension assembly 164 is secured to oil rig 110. Hook 182 on crane cable 180 engages the lifting assembly on storage device 120 by engaging clevis 155 that is secured to ring 156 on the top of storage device 120. First pulley 176 is activated to wind crane cable 180 onto first pulley 176. As this occurs, storage device 120 is drawn upwardly toward the loop formed by support members 190 of frame assembly 172. Storage device 120 is guided into the loop and is moved upwardly until the uppermost surface of storage device 120 is disposed adjacent first members 186a, 188a of first and second struts 186, 188 (FIG. 14). At this point, second members 186b, 188b of first and second struts 186, 188 and support members 190 are in abutting contact with side walls of storage device 120. Preferably, support members 190 are disposed around the midpoint of the side walls of storage device 120. Crane cable 180 is wound onto first pulley 176 to a sufficient degree that storage device 120 is wedged tightly against frame assembly 172. First pulley 176 is deactivated and locked in place so that storage device 120 is securely retained by suspension assembly 164 alongside a portion of the side of oil rig 110. The combination of the upward force exerted on storage device 120 by crane cable 180 and the downwardly-directed force exerted on storage device 120 by frame assembly 172 ensures that storage device 120 is restricted in its possible movements relative to arm 170 and the side of rig 110.

When it is necessary to deploy storage device 120, first pulley 176 is activated to lower storage device 120 out of frame assembly 172. Once storage device 120 is fully clear of frame assembly 172, clevis pin 157 is disengaged to detach clevis 155 from ring 156, D-clips 150 are disengaged from ring 156, zipper 139 is unzipped and storage device 120 is opened to release the oil boom lengths (shown in FIG. 3) therefrom.

Figure 18:
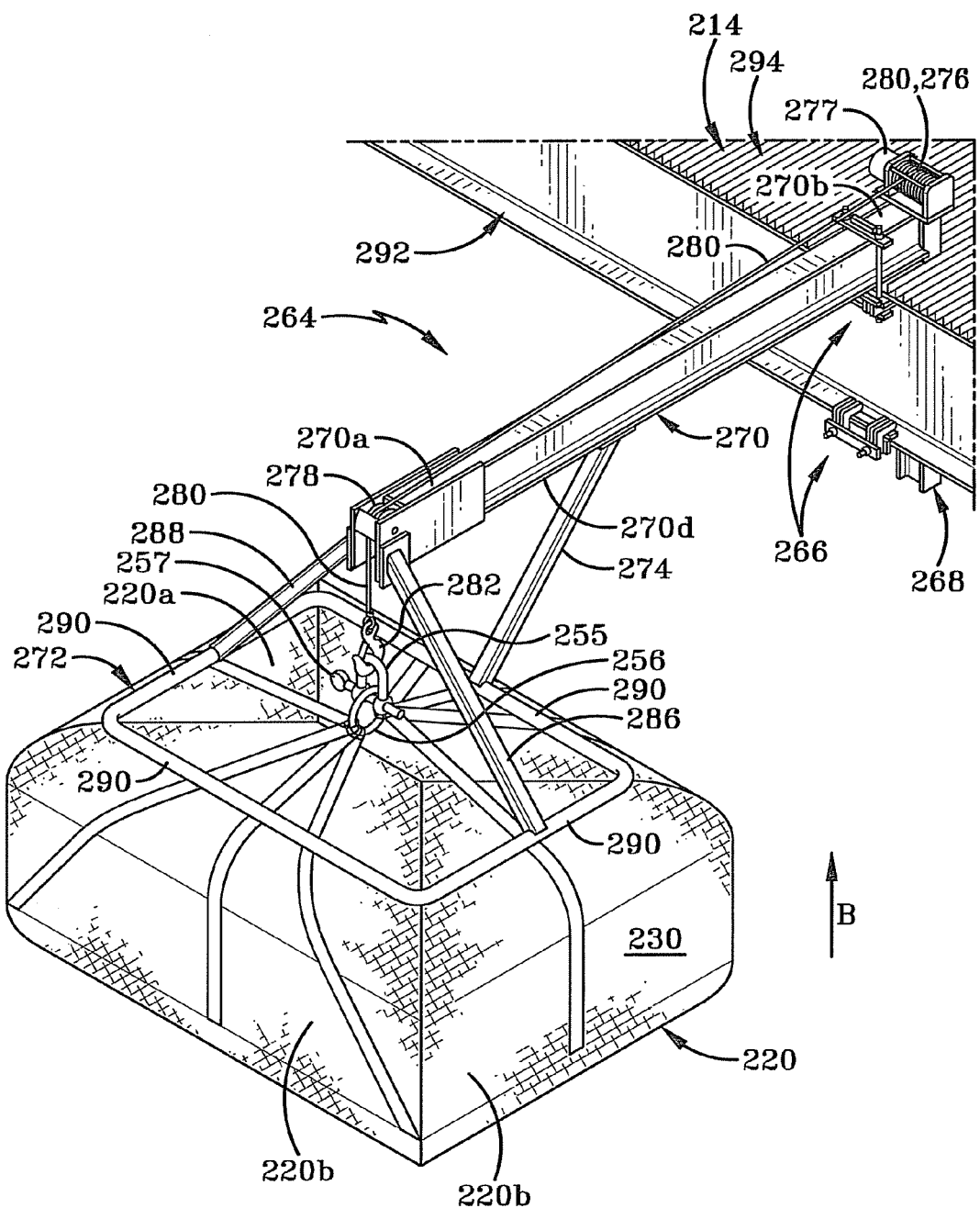
FIG. 18 is a perspective view of a second embodiment of a suspension assembly in accordance with the present invention.

FIG. 18 shows a second embodiment of a suspension assembly in accordance with the present invention generally indicated at 264. Suspension assembly 264 is designed to be engaged with I-beam 292 by way of clamping mechanism 266. Suspension assembly 264 includes upright 268 that is inserted through a notch (not numbered) in grating 294 on deck 214 of an oil rig. Suspension assembly 264 further includes an arm 270 with a first pulley 276 and a motor 280 at a second end 270b thereof, and a second pulley 278 at a first end 270a thereof. Suspension assembly 264 is substantially identical to suspension assembly 164 except for the configuration of the frame assembly 272 provided at first end 270a of arm 270. Frame assembly 272 includes first and second struts 286, 288 that are substantially comprised only of a first member which is secured at a first end to arm 270 and is secured at a second end to support members 290. Support members 290 again preferably form a closed loop that is disposed so as to engage storage device 220. A stabilizing bar 274 extends between arm 270 and support members 290 and preferably bar 274 is disposed at about an angle of 45° relative to bottom surface 270d of arm 270. In this instance support members 290 are configured to contact a top surface 220a of storage device 220 instead of contacting the side surfaces 220b thereof, as was the case with storage device 120. Storage device 220 is substantially identical to storage device 120 and comprises a tarpaulin 230 that is folded and secured about a stack of floating oil boom (not shown).

Crane cable 280 is engaged with storage device 220 via hook 282, clevis 255, ring 256 and pin 257. When motor 280 is activated to wind crane cable 280 onto first pulley 276, storage device 220 is moved upwardly in the direction of arrow "B" (FIG. 18) until it is tightly retained against a lower surface of each support member 290. Crane cable 280 is pulled taut enough that storage device 220 is held in a substantially stable, fixed position relative to arm 270 and therefore relative to the side of rig 110. Stabilizing bar 274 ensures that frame assembly 272 is rigidly held in place so that assembly 272 can withstand the upwardly directed force exerted thereon by storage device 220.

It will be understood that while support members 190, 290 have been shown as a plurality of members welded or otherwise secured together, they may instead comprise four individual members that are secured independently into frame assembly 272. These individual members may be positioned so as to contact various locations on the storage device in order to retain the storage device in a stable position relative to arm 270. It will further be understood that the stabilizing bar may be of a different shape and may be secured to a different one of the support members than has been shown in the attached figures. Additionally, there may be more than one stabilizing bar extending between the arm 170, 270 and support members 190, 290 without departing from the scope of the present invention.

It will further be understood that arm 170, 270 may be of a fixed length or may be variable in length to retain the storage device either a fixed distance or a variable distance from the side of the oil rig or ship on which the arm is mounted. Still further, arm 170, 270 may be configured to be pivotable around a pivot on upright 168, 268 without departing from the scope of the present invention. Additionally, other mechanisms other than the clamping mechanism 166, 266 may be utilized to secured suspension assembly 164, 264 to the oil rig or ship.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. In combination;
   a length of a floating oil boom; and
   a storage device comprising:
      a sheet of material having an interior surface, an exterior surface, a first end and a second end, wherein said sheet of material is foldable to define and surround an interior cavity; and wherein the length of the floating oil boom is retained within the cavity when the sheet of material is in a folded condition;
      a closure mechanism for retaining the sheet of material in the folded condition;
      a connector member engageable with the closure mechanism and adapted to be engaged by a suspension assembly to retain the storage device adjacent a side region of a vessel for use on large bodies of water.

2. The combination as defined in claim 1, further comprising;
   the vessel for use on large bodies of water; said vessel having a deck and a sidewall extending downwardly from the deck, wherein at least a portion of the sidewall is adapted to be disposed a distance vertically above the water; and wherein the suspension assembly is mounted on the vessel and retains the storage device adjacent the sidewall and disposed a distance vertically above the water.

3. The combination as defined in claim 2, wherein the vessel is adapted for one of exploration for crude oil, recovery of crude oil, and transportation of crude oil.

4. The combination as defined in claim 2, wherein the suspension assembly comprises:
   a crane mounted on the vessel,
   a first pulley on the crane;
   a crane cable windable about the first pulley;
   a hook disposed on free end of the crane cable, said hook being engageable with the connector member on the storage device.

5. The combination as defined in claim 4, wherein the crane includes:
   a vertical upright mountable on the vessel;
   an arm extending outwardly from the upright, wherein the first pulley is disposed at a first end of the arm;
   a frame assembly secured to the first end of the arm; said frame assembly configured to engage a region of the storage device.

6. The combination as defined in claim 5, wherein the frame assembly includes:
   a first strut that extends outwardly from a first side surface of the first end of the arm;
   a second strut that extends outwardly from a second side surface of the first end of the arm; and
   at least one support member extending outwardly from one of the first and second struts; where the at least one support member is disposed generally parallel to the arm.

7. The combination as defined in claim 6, further comprising a stabilizing bar; said bar extending between a portion of the arm and the at least one support member.

8. The combination as defined in claim 7, wherein the stabilizing bar is disposed at an angle of about 45° relative to a bottom surface of the arm.

9. The combination as defined in claim 6, wherein the frame assembly includes a plurality of support members that are secured to each other to form a closed loop, and wherein the stabilizing bar extends between the arm and the loop, and the loop is disposed to abut one of a top region and a side region of the storage device.

10. The combination as defined in claim 4, wherein the crane is secured to the vessel without the use of welding or a blow torch.

11. The combination as defined in claim 4, further including a clamping mechanism, said clamping mechanism engaging a portion of crane and clamping the same against a region of one of the deck and sidewall of the vessel.

12. The combination as defined in claim 2, wherein the suspension assembly is removably mounted on the vessel.

13. The combination as defined in claim 12, wherein the suspension assembly retains the storage device adjacent the sidewall of the vessel until the oil boom retained within the storage device is needed.

14. The combination as defined in claim 2, further comprising a plurality of suspension assemblies and a plurality of storage devices, each storage device retaining a separate length of oil boom therein, and wherein the suspension assemblies are mounted at intervals from each other on the vessel and retain the storage devices adjacent the sidewall of the vessel until the oil boom lengths are needed in an emergency.

15. A method of storing an extended length of floating oil boom comprising;
   folding a flexible sheet of material around a stack of the floating oil boom;
   securing the folded sheet of material to itself to form a package so that the stack of floating oil boom is retained within an interior cavity of the package;
   engaging a lifting member on the package;
   connecting the lifting member to a suspension assembly mounted on a vessel used in large bodies of water; and
   hanging the package from a suspension assembly cable so that the package is disposed adjacent an exterior surface of a sidewall of the vessel and is retained a spaced distance vertically above an upper surface of a large body of water.

16. The method as defined in claim 15, further comprising the step of mounting the suspension assembly to the vessel.

17. The method as defined in claim 16, wherein the step of mounting the suspension assembly to the vessel is accomplished without the use of a blow torch or welding.

18. The method as defined in claim 16, wherein the step of mounting the suspension assembly includes the steps of:
   inserting a vertical upright of a cantilevered crane through a hole in the deck of the vessel;
   clamping an arm of the crane against a first portion of an I-beam on a sidewall of the vessel using a first clamping member; and clamping the vertical upright against a second portion of the I-beam using a second clamping member.

19. The method as defined in claim 15, including the steps of:
abutting a portion of a frame assembly on the suspension assembly against a region of the storage device; and
winding the suspension assembly cable onto a pulley until it is held taut.

20. The method as defined in claim 15, further including the steps of:
providing a plurality of shorter lengths of floating oil boom that are connectable together to make up the extended length of floating oil boom;
folding each of the shorter lengths;
stacking the folded shorter lengths together on an interior surface of the flexible storage device so as to form a stack;
folding the flexible storage device so as to totally surround the stack; and
engaging a closure mechanism to secure the storage device in its folded position about the stack.

\* \* \* \* \*